United States Patent [19]

Davis

[11] Patent Number: 4,606,076
[45] Date of Patent: Aug. 12, 1986

[54] COMMUNICATION RECEIVER SYSTEM HAVING A VOLTAGE CONVERTER WITH AN OPERATING FREQUENCY BELOW THE RECEIVER IF

[75] Inventor: Walter L. Davis, Coral Springs, Fla.
[73] Assignee: Motorola, Inc., Schaumburg, Ill.
[21] Appl. No.: 689,368
[22] Filed: Jan. 7, 1985
[51] Int. Cl.[4] .......................... H04B 1/16; H04B 1/10; H02M 3/325
[52] U.S. Cl. ...................................... 455/343; 363/39; 455/298
[58] Field of Search ............... 455/343, 298, 299, 127; 363/39; 323/354

[56] References Cited

U.S. PATENT DOCUMENTS 3,501,686   3/1970   Tveteras et al. ...................... 363/39
4,355,277  10/1982   Davis et al. .......................... 323/351

Primary Examiner—Marc E. Bookbinder
Attorney, Agent, or Firm—Joseph T. Downey; Edward M. Roney; Donald B. Southard

[57] ABSTRACT

A communication receiver system for receiving coded signals and of the type having at least one predetermined intermediate frequency (IF) signal comprising a decoder for detecting and decoding the received coded signals and a DC/DC voltage converter circuit, connected to the decoder, for generating a voltage greater than the supply voltage of the communication receiver system at a frequency below the frequency of the IF signal. The system further comprises a frequency trim circuit, connected to the voltage converter circuit, for controlling the operating frequency of the DC/DC voltage converter circuit whereby interference with the IF signal is prevented.

5 Claims, 3 Drawing Figures

RAMP OUTPUT TO COMPARATOR

४,६०६,०७६

COMMUNICATION RECEIVER SYSTEM HAVING A VOLTAGE CONVERTER WITH AN OPERATING FREQUENCY BELOW THE RECEIVER IF

BACKGROUND OF THE INVENTION

This invention relates to the field of DC/DC converters and associated frequency trim circuitry therefor and, more particularly to a converter which operates efficiently in a communication receiver environment at frequencies below the intermediate frequency (IF) of the communication receiver without initiating "self-quieting" of the radio.

Presently, DC/DC converters are widely used in systems requiring voltages higher than the power supply or battery can provide. In particular, DC/DC converters are now commonly used in radio paging receivers to generate a 3 volts supply from a one cell 1.5 volt battery in order to provide for the proper operation of a CMOS microcomputer decoder circuit.

In the past, the use of coil-type DC/DC converters in communication receivers has caused interference and desensitization problems that could only be solved by restricting the operating frequency of the converter to either very low audio frequencies (<10 KHz), or to frequencies above the final IF or intermediate frequency used in the receiver. The interference and desensitization are caused by harmonic signals that are generated by the switching waveforms within the DC/DC converter, and are coupled into the amplifier stages of the receiver by various stray capacitive and inductive coupling mechanisms. Limiting the operating frequency of the converter to frequencies above the final IF insures that the interference signals generated by the converter will all be at frequencies that lie above the final IF, and thus there will be no interference. Similarly, limiting the operation of the converter to very low frequencies insures that only very high level harmonics are potential sources of interference and, since the energy in the harmonics of the switching signal decreases rapidly with increasing harmonic frequencies the level of interference is effectively minimized.

The prior art restrictions on the operating frequencies of DC/DC converters directly impact the size and performance of the converter. In particular, the optimum converter efficiency that can be achieved with the physically small coils that must be used in paging receivers is obtained for operating frequencies in the range from 50 to 150 KHz. Since this desired range of operating frequencies is harmonically "close" to the 455 KHz IF frequency that is commonly used in receivers, it has become desirable to provide a technique for using DC/DC converters in communication receivers that allows the converter to operate at frequencies that are low order harmonic sub-multiples of the IF frequency.

SUMMARY OF THE INVENTION

It is therefore an object of the present invention to provide a DC/DC converter with supporting circuitry which enables it to operate at a frequency below the IF of the communication receiver.

It is another object of the present invention to provide a DC/DC converter with supporting circuitry which operates at a frequency which is selected such that the harmonics thereof do not cause interference with the IF signal of the communication receiver.

It is yet another object of the present invention to provide a frequency trim circuit which controls the input to a DC/DC converter such that the output signal from the DC/DC converter does not interfere with the IF signal of the communications receiver.

It is still another object of the present invention to provide a frequency trim network for a DC/DC converter that can be implemented on the same bipolar integrated circuit as the DC/DC converter.

These and other objects which will become apparent are provided in accordance with the invention wherein a frequency trim circuit is connected to the input of the DC/DC converter to control the operating frequency of the DC/DC converter. More particularly, the frequency trim circuit is trimmed to a level such that the operating frequency of the DC/DC converter which is below the IF of the communication receiver does not produce harmonics which interfere with the intermediate frequency of the communication receiver.

DETAILED DESCRIPTION OF THE PREFERRED EMBODIMENT

Figure 1:
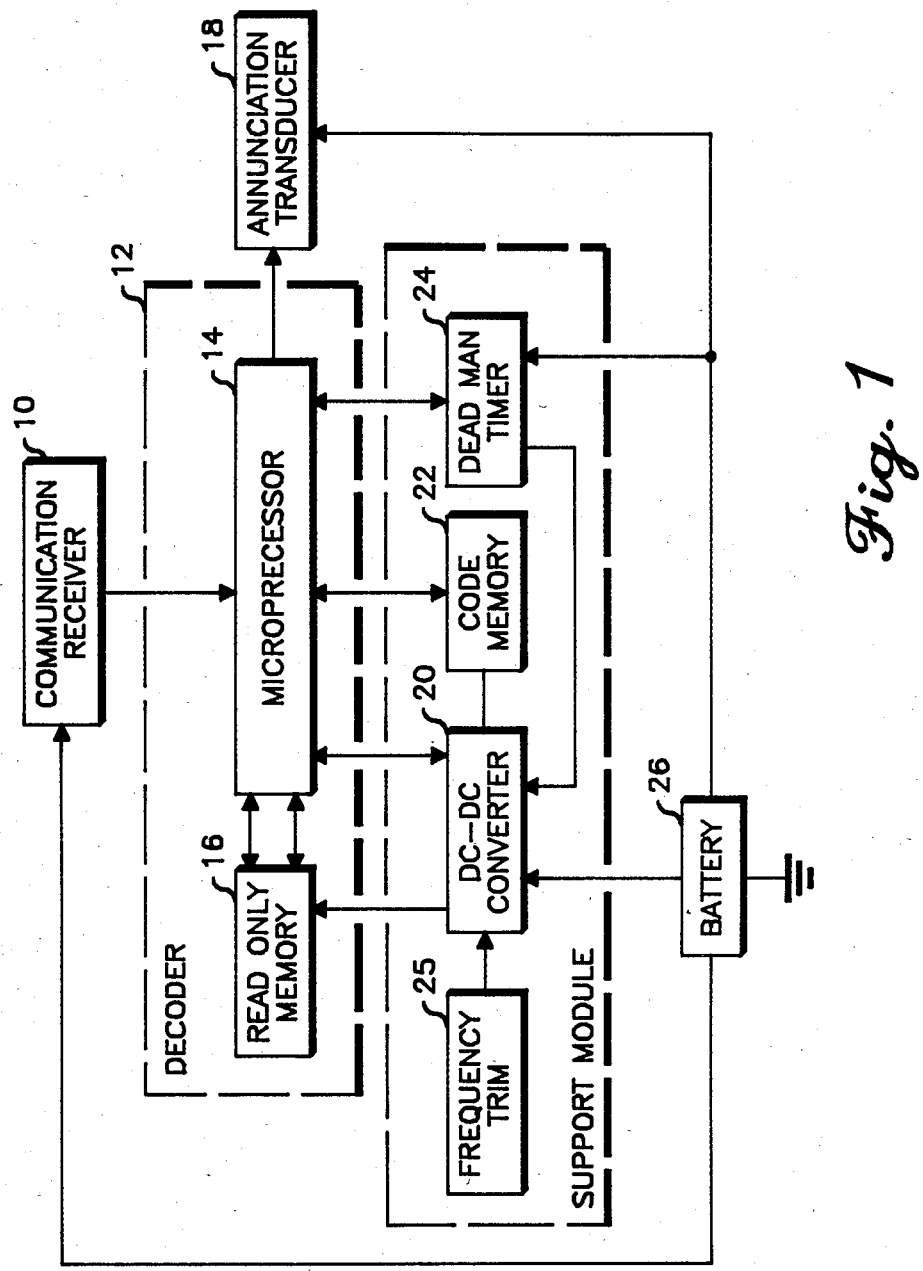
FIG. 1 a block diagram illustrating the use of the invention in a personal communications receiver.

FIG. 1 shows a functional block diagram of a paging receiver utilizing the present invention. Specifically, a communications receiver 10 is connected to a selective signalling decoder 12 which comprises a microprocessor 14 and a read-only memory 16. The decoder 12 is further interconnected with an annunciation transducer 18, a DC/DC converter 20, a code memory 22 and a deadman timer 24. The operating frequency of the DC/DC converter 20 is controlled by the frequency trim circuit 25.

The receiver 10, the DC/DC converter 20, and the deadman timer 24 are directly connected to a battery 26, which powers the operation of these blocks and is the energy source for the DC/DC converter 20. The DC/DC converter 20 generates the power levels required for the operation of the microprocessor and the code memory 22.

In operation, the communication receiver 10 which has a predetermined IF frequency, recovers signals transmitted over a communications channel and supplies that signal to the decoder 12 which includes the microprocessor 14. The microprocessor decodes the recovered signal by determining if it contains a data pattern equivalent to one of the one or more signal patterns stored in code memory 22. If a pattern match is detected, the microprocessor activates the annunciation transducer 18 and causes an appropriate alert signal to be generated to inform the user that a paging signal has been received.

In order to minimize the drain from the battery 26, the microprocessor is operated in two modes; a high power drain, fully operational mode in which it can decode signals in real time; and a reduced power drain, reduced computational ability mode in which it merely times the interval to the next transition to the high drain state. To take full advantage of the power saving, dual mode operation of the microprocessor, the DC/DC converter power source 20 also has two operational states that correspond to the two modes of the microprocessor. That is, the converter 20 has a high output state in which it can supply the power required to operate the decoder in its high power drain mode, and a reduced output state in which it can supply the power required to operate the decoder in its low power drain mode.

Thus, in its low power output state, DC/DC converter 20 is adjusted to supply a greatly diminished power level with maximum efficiency. When the converter is in its low output state, it cannot support the fully operational mode of the microprocessor. One such DC/DC converter is that described in U.S. Pat. No. 4,355,277 which issued on Oct. 19, 1982 in the name of Walter L. Davis, et al., entitled "Dual Mode DC/DC Converter" and assigned to the assignee of the present application which is hereby incorporated by reference.

During the normal operation of the system, the microprocessor controls the operation of the DC/DC converter 20 and switches the output state of the converter in accordance with its power demands. A control input from the deadman timer 24 is also connected to the converter 20, and this signal path places the converter in the high output state if the microprocessor should experience a program execution failure and require reinitialization.

Figure 2:
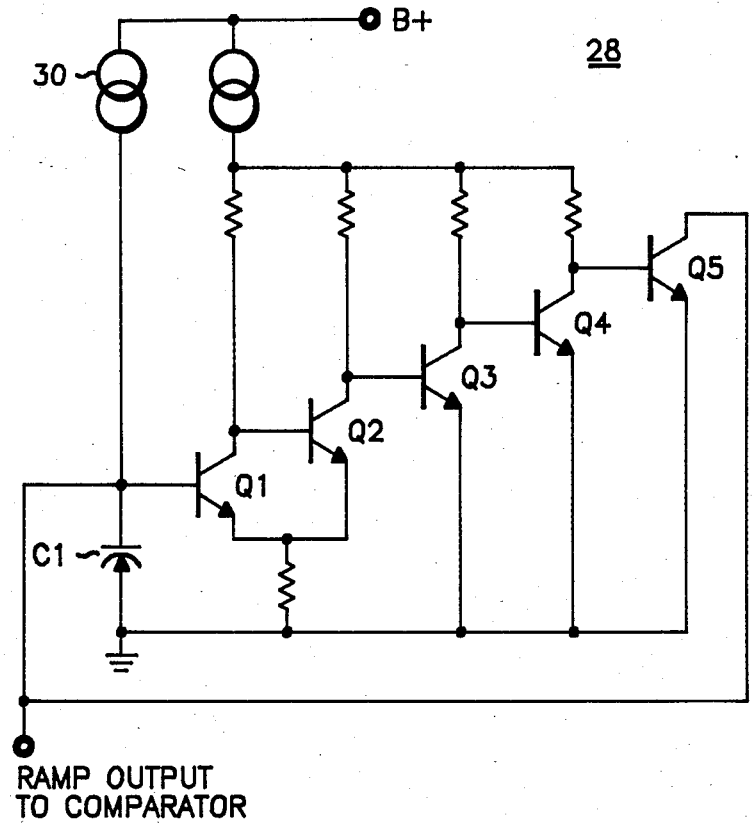
FIG. 2 is an electrical schematic diagram of the ramp generator circuit portion of the DC/DC converter 20 of FIG. 1.

The DC/DC converter 20 is driven at a frequency that is determined by the operating frequency of a ramp generator circuit, shown in FIG. 2. This figure is a duplicate of FIG. 7 in U.S. Pat. No. 4,355,277, and is presented here for convenience.

The operating frequency of the ramp generator is given by:

$$F_{ramp} = KI_s/C_1$$

where:
 K=Constant determined by transistor and circuit parameters
 $I_s$=Current supplied by current source 30
 $C_1$=Capacitance of Capacitor $C_1$ Thus, it can be seen that the operating frequency can be directly controlled and varied by controlling and varying the value of the current supplied by current source 30.

Figure 3:
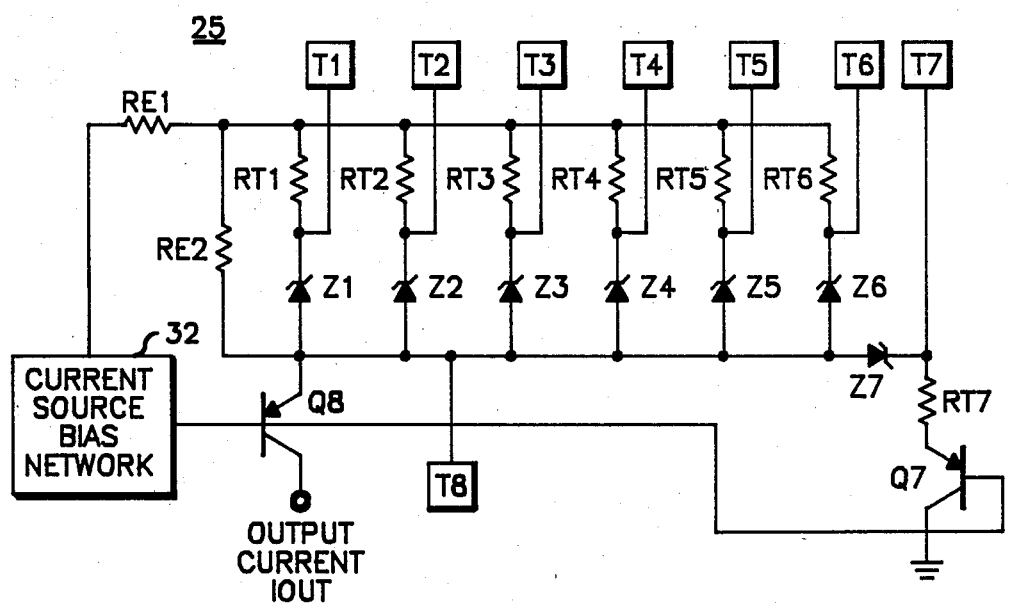
FIG. 3, is a schematic diagram of the frequency trim circuit of FIG. 1.

Referring now to FIG. 3, a schematic diagram of the frequency trim circuit of FIG. 1 is illustrated. This circuit is used to implement the current source 30 shown in FIG. 2. The frequency trim circuit 25 is comprised of the resistor RE1 having one end connected to the current source bias circuit 32 and the other end connected to the resistor RE2 and resistors RT1–RT6 and the transistor Q6 which has a collector connected to the input of the ramp generator circuit 28, its base connected to the output of a current source bias circuit 32 and its emitter connected to the emitter resistor RE2 as well as the plurality of trimming networks which will be described in more detail hereinafter.

The first trimming network is comprised of the trimming resistor RT1 in series with the zener diode Z1 which has one end connected to the emitter of the transistor Q6. The junction between the resistor RT1 and the other end of the zener diode Z1 is also connected to the programming pad T1. The second trimming network is comprised of the transistor RT2 and zener diode Z2 which has one end connected to the emitter of the transistor Q6. The junction between the resistor RT2 and the other end of the zener diode Z2 is connected to the programming pad T2. The third trimming network is comprised of the resistor RT3 in series with the zener diode Z3 which has one end connected to the emitter of the transistor Q6. The junction between the resistor RT3 and the other and of the zener diode Z3 is connected to the programming pad T3. The fourth trimming network is comprised of the resistor RT4 in series with the zener diode Z4 which has one end connected to the emitter of the transistor Q6. The junction between the resistor RT4 and the other end of the zener diode Z4 is connected to the programming pad T4. The fifth trimming network is comprised of the resistor RT5 in series with the zener diode Z5 which has one end connected to the emitter of the transistor Q6. The junction between the resistor RT5 and the other end of the zener diode Z5 is connected to the programming pad T5. The sixth trimming network is comprised of the resistor RT6 in series with the zener diode Z6 which has one end connected to the emitter of the transistor Q6. The junction between the resistor RT6 and the other end of the zener diode Z6 is connected to the programming pad T6. The seventh trimming network is comprised of the transistor Q7 which has its emitter connected to the series combination of resistor RT7 and one end of the zener diode Z7. The junction between the resistor RT7 and one end of the zener diode Z7 is connected to programming pad T7, while the other end of the zener diode is connected to one end of the zener diode Z6. The base of the transistor Q7 is connected to the output of the current source bias circuit 32 while the collector of the transistor Q7 is connected to ground. All the ends of the zener diodes Z1 through Z7 that are connected to the emitter of the transistor Q6 are also connected to the pad T8.

The current source bias network 32(FIG. 3) used in the preferred embodiment is a conventional band-gap type of reference in which the component values have been selected to set a reference bias level of 5 microamperes for PNP transistor Q6 connected directly across its output bias terminals.

In the preferred embodiment, resistor RE1 has a value of 1.0 kilo-ohm, RE2 has a value of 6.2 kiloohms, RT1 has a value of 7.2 kilo-ohms, RT2 has a value of 14.4 kilo-ohms, RT3 has a value of 28.8 kilo-ohms, RT4 has a value of 57.6 kilo-ohms, RT5 has a value of 115 kilo-ohms, RT6 has a value of 230 kilo-ohms and RT7 has a value of 2 kilo-ohms. These values, together with the bias voltages provided by the current source bias circuit, provide a nominal (untrimmed) output current of 2.50 micro-amperes for the trim circuit 25, and the output can be varied by plus or minus 35% by programming the appropriate zener fuse elements.

The frequency trim circuit 25 is initially programmed by applying high current programming pulses to the zener fuse elements Z1 through Z7. Passing the appropriate current through the zeners causes them to be shorted out by a very low resistance conductive path that forms across the diode junction. The conductive path is formed by Aluminum metal atoms that are carried across the diode junction by the well known avalanche induced migration transport mechanism. That is, the high programming current pulse carries Aluminum atoms from the device terminals across the semiconductor junctions, generating a short circuit. Thus, by programming zener fuses Z1 through Z6, resistors RT1 through RT6 can be connected into the circuit across emitter resistor RE2, which increases the output current from transistor Q1. Similarly, the output current of Q6 can be decreased by programming zener fuse Z7 via pad T7, which connects transistor Q7 into the circuit and forms a shunt path that diverts to ground some of the current that would otherwise flow from RE2 into transistor Q1.

The values of resistors RT1 through RT6 have been selected to be increasing multiples of 2 times the smallest resistor RT1. This insures that the equivalent resistance of the network formed by RE2 plus all of the programmed trim resistors can be trimmed over a wide range with a minimum resolution of 1.6%. These trim resistor values, plus the logrithmic relation between the value of the output current and the equivalent emitter resistance between the emitter of Q6 and the B+supply, as determined by the well known diode equation for semiconductor diodes, allow the output current to be trimmed or adjusted over a wide range with a resolution of better than 1%.

Thus, by programming combinations of zener fuses Z1 through Z7, the value of the output current of transistor Q6 can be trimmed over a wide range with a resolution or step size of less than 1%. Further, since the frequency of the ramp generator 28 in the DC/DC converter is directly dependent on the current from transistor Q6, it follows that the operating frequency of the converter can be accurately and precisely trimmed or adjusted over a wide range by programming the zener fuses Z1 through Z7.

In practice, the untrimmed frequency of the DC/DC converter can be measured at the wafer probe or package testing levels of the integrated circuit fabrication process, and the measured value of the untrimmed frequency is used to determine which fuses should be programmed to set the frequency at the desired value. The appropriate fuses are then programmed, and the frequency is remeasured to insure that it falls within the allowable test limits. The manner in which the fuses to be programmed are determined from the value of the untrimmed measured frequency simply involves calculating the resistance change needed to achieve the required change in output current. This procedure will be well understood by persons skilled in the I.C. design art and the details are not presented herein.

It should be noted that in the preferred embodiment, the intermediate frequency of the communications receiver 10 is 455 MHz. Thus, it is necessary to select a frequency of operation for the DC/DC converter 20 such that its signal does not interfere with the 455 MHz IF frequency. In order to select an appropriate frequency of operation for the DC/DC converter, the harmonics generated by the switching waveforms of the DC/DC converter must be considered, and the operating frequency range must be selected so that no harmonics fall within the IF bandwidth of the receiver.

The communications receiver 10 will typically contain a bandpass filter at the input of the IF amplifier that serves to eliminate interferring signals. In the typical application with a 455 KHz IF, this filter is a ceramic device with the pass-band centered at 455 KHz and a 3 dB bandwidth of 10 KHz (plus or minus 5 KHz).

In order to minimize receiver pickup of the interference signals generated by the DC/DC converter 20, the operating frequency of the DC/DC converter 20 must be selected so that no signficant harmonic of the operating frequency falls within the pass-band of the IF filter. In the past, this has been accomplished by placing the operating frequency above the IF, or at low audio frequencies.

If however, the lower and upper pass-band frequencies of the IF filter are represented by $f_{low}$ and $f_{high}$ respectively, a narrow range of allowable DC/DC converter 20 operating frequencies can be calculated as follows:

If the DC/DC converter 20 frequency is allowed to lie within a narrow range of frequencies between $F_{cl}$ and $F_{ch}$, no harmonics will fall within the IF pass-band if the harmonic frequency bands defined by $nF_{cl}$ to $nF_{ch}$, $n=1,2,3\ldots$, do not fall within the IF pass-band for any value of n. An acceptable band of operating frequencies can be constructed by requiring that:

$nF_{ch}$ is less than or equal to $f_{low}$ $(n+1)f_{cl}$ is greater than or equal to $f_{high}$ for some selected value of n. This criteria basically insures that the top end of one harmonic band is below the lower IF pass-band frequency, and that the bottom end of the next harmonic band is above the upper pass-band frequency.

To provide wide operating or safety margins, the pass-band of the IF amplifier that is sensitive to interference should be assumed to be larger than the 3 dB bandwidth of the IF filter. Using the 40 dB bandwidth of the filter has given good results. Thus, an interference bandwidth of plus or minus 20 KHz has been shown to give good results for a 3 db pass-band of plus or minus 5 KHz, and Table I summarizes the allowable ranges of converter operating frequencies that result for an interference bandwidth of 455 KHz plus or minus 20 KHz.

TABLE I

| | CONVERTER FREQUENCY RANGE, KHz | | | |
|---|---|---|---|---|
| n | $f_L$ | $f_{nominal}$ | $f_H$ | % |
| 3 | 118.75 | 131.22 | 145.00 | ±10.0 |
| 4 | 95.00 | 101.64 | 108.75 | ±6.76 |
| 5 | 79.17 | 82.99 | 87.00 | ±4.72 |
| 6 | 67.86 | 70.14 | 72.50 | ±3.30 |

It should be understood that the resultant frequency bands are rather narrow-especially where the make or manufacturing tolerances of integrated circuit components are concerned, and that the converter frequency must be accurately controlled or adjusted to avoid interference problems in the receiver 10.

In the preferred embodiments, a value of n=5 was found to give optimum results in terms of DC/DC converter 20 efficiency, coil size, and the stability of the DC/DC converter 20 frequency over voltage and temperature extremes.

Thus, the converter frequency is trimmed at the wafer probe portion of the IC manufacturing process to 83.00 plus or minus 3.00 KHz and the frequency remains within plus or minus 4.00 KHz of nominal over the temperature range of 0° C. to +50° C. and a battery voltage range of 1.1 to 1.5 volts.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A communication receiver system for receiving coded signals and of the type having at least one predetermined intermediate frequency (IF) signal, comprising:

decoder means for detecting and decoding received coded signals;

voltage converter means, connected to said decoder means, for generating a voltage greater than a supply voltage of said communication receiver system, and operating at a frequency below the frequency of the IF signal; and frequency trim circuit means, connected to said voltage converter means, for controlling the operating frequency of said voltage converter means whereby interference with said IF signal is prevented.

2. A communication receiver system, according to claim 1, wherein said frequency trim circuit means trims the operating frequency of said voltage converter means to a value that is subharmonically unrelated to the frequency of the IF signal.

3. A communication receiver system, according to claim 1, wherein said frequency trim circuit means trims the operating frequency of said voltage converter means whereby there are no harmonics that fall within a predetermined band of frequencies around the frequency of the IF signal.

4. A communications receiver system, according to claim 1, wherein said voltage converter means is a DC/DC voltage converter.

5. A communications receiver system, according to claim 1, wherein said frequency trim circuit means is programmable to either increase or decrease an output current thereof.

* * * * *